March 29, 1932.　　　W. M. SHALLCROSS　　　1,851,022
AUTOMATIC REGULATOR FOR PUMPING PLANTS
Filed Nov. 12, 1928　　　2 Sheets-Sheet 1
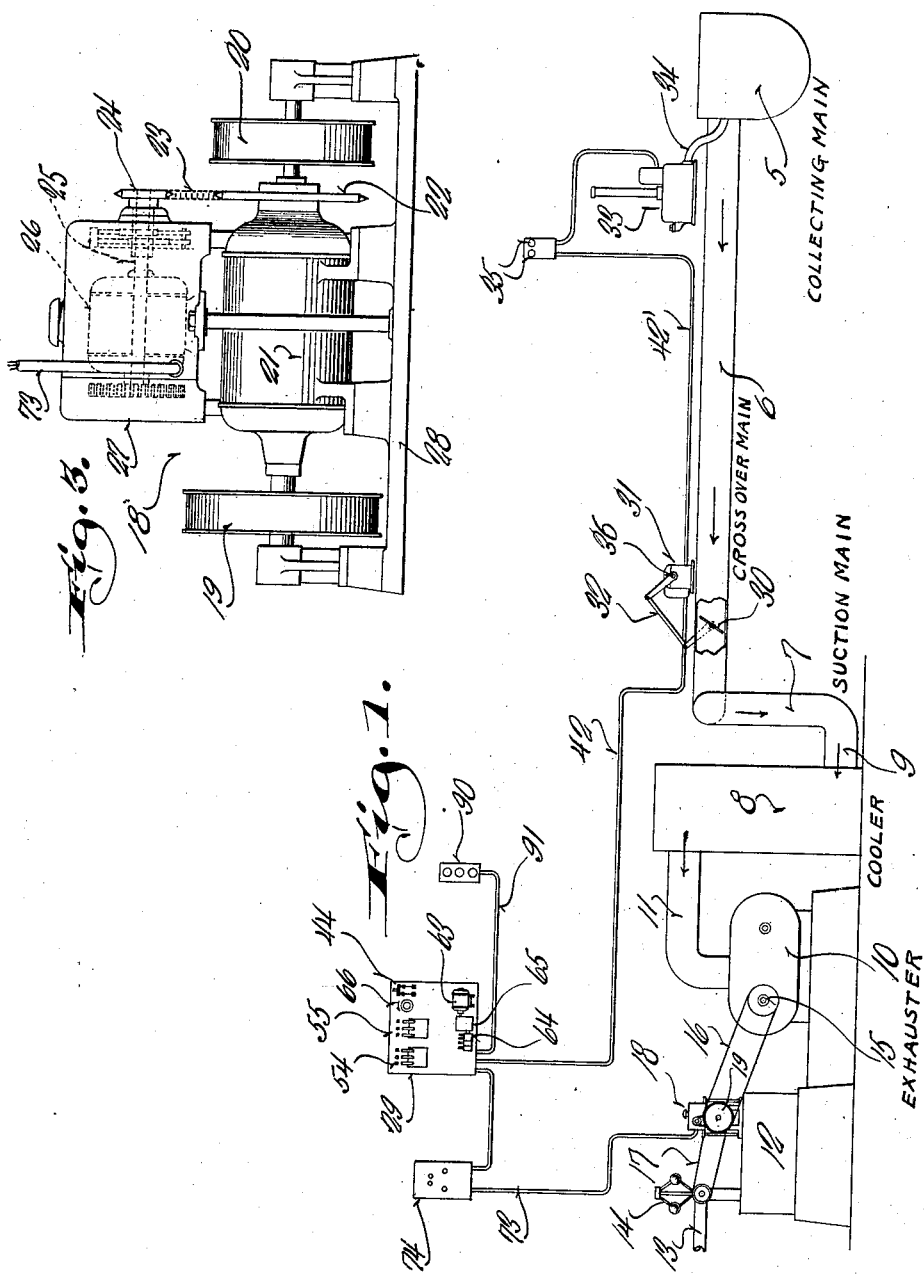
Inventor
Wilmer M. Shallcross.
By
Attorney

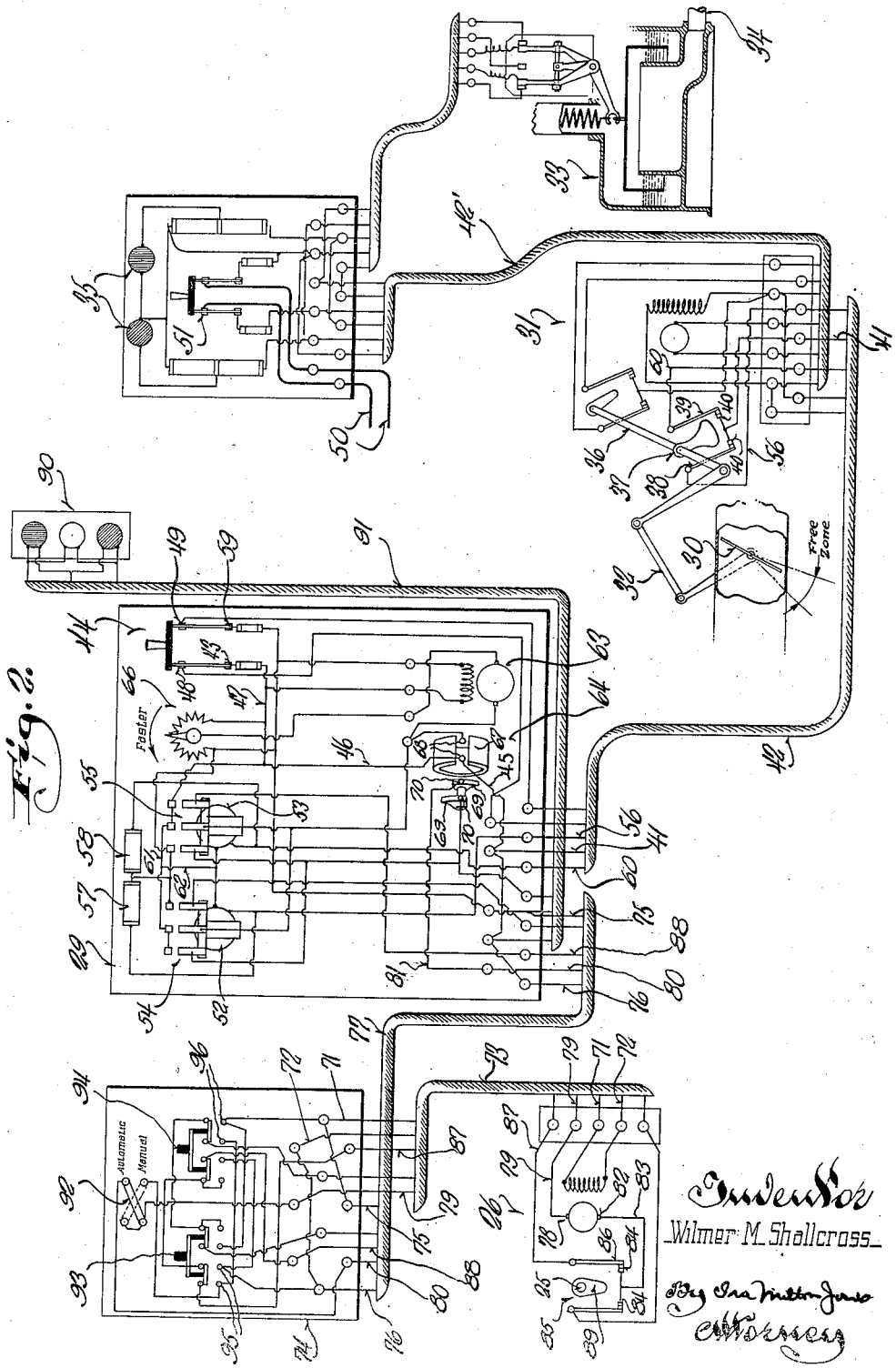

Patented Mar. 29, 1932

1,851,022

UNITED STATES PATENT OFFICE

WILMER M. SHALLCROSS, OF MILWAUKEE, WISCONSIN, ASSIGNOR TO SHALLCROSS CONTROL SYSTEMS COMPANY, OF MILWAUKEE, WISCONSIN, A CORPORATION OF WISCONSIN

AUTOMATIC REGULATOR FOR PUMPING PLANTS

Application filed November 12, 1928. Serial No. 318,893.

This invention relates to certain new and useful improvements in gas and by-product coke oven plants and pertains to the means for automatically controlling the operation of such plants.

In plants of this type, the ovens are divided into batteries each of which has a collecting main which discharges through an associated crossover main into a suction main common to all the batteries. To insure a maximum degree of efficiency in the operation of a battery of ovens, the variation in the pressure within the collecting main is limited to one or two millimeters of water column by a valve placed in the crossover main which opens and closes upon the dictation of a collecting main governor responsive to pressure changes within the collecting main. This regulator may be of the type described in Letters Patent Number 1,588,149, issued June 8, 1926.

From the suction main, the gas is carried through coolers to an exhauster main leading to the intake of an exhauster which, to retain the efficient functioning of the oven battery, must properly draw off the liberated gas. As is well known, the volume of gas liberated from the ovens varies from time to time changing suddenly when a fresh oven is thrown on the main and, gradually, as this rush of gas subsides. Any change in the charging rate also produces a variation in the rate of gas flow and the exhauster, therefore, must be operated at a speed proportioned to this rate of gas flow.

In the past, the speed of the exhauster has been controlled primarily by a suction control system responsive to the pressure in the suction main just ahead of the coolers which has proven objectionable in that it is almost impossible to prevent hunting and seesawing between its control and that of the pressure regulator of the collector main, as this provided two independent regulators controlling the same gas line.

Furthermore, previous methods of regulating the exhauster speed to provide the desired suction attempted to change its speed for each small variation, and as an exhauster is an extremely heavy, cumbersome and sluggish piece of mechanism it always lagged behind the condition it attempted to correct, doing more harm than good.

It is, therefore, an object of this invention to provide an exhauster speed control which does not set up "hunting" with the collector main regulators or other governors.

Another object of this invention resides in the provision of means for regulating the speed of an exhauster which functions only upon an excessive rise or fall of the rate of flow and thereby maintains the suction of the exhauster at a minimum average.

This invention obtains these objects, and regulates the speed of the exhauster in accordance with the volume of gas liberated through the medium of a variable speed control governed directly from the valve in the cross over main and so arranged that the exhauster speed remains unchanged as long as the valve is within a "free zone" and is changed whenever the valve reaches either edge of this "free zone". This, in effect, is that the collecting main regulator maintains the pressure of the collecting main within very narrow limits but whenever conditions get such that it nears the limits of its effectiveness it calls for help from the exhauster control which corrects these conditions.

The exhauster control consists primarily of a variable speed transmission interposed in the drive connection between the usual governor of the exhauster engine which may be of the fly ball or any other type and the engine shaft, the drive of which is actuated to change the speed ratio whenever the valve in the crossover main reaches either edge of its "free zone" and as the exhauster is at all times under control of its fly ball governor, its speed is increased or decreased, depending upon which edge of the "free zone" the valve has passed in the crossover main.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a diagrammatic view of a coke oven plant provided with my improved controls;

Figure 2 is a schematic view of the electrical connections thereof; and

Figure 3 is a view of the variable speed transmission which is interposed in the drive of the exhauster engine governor.

Referring now more particularly to the accompanying drawings in which like numerals designate like parts throughout the several views, 5 represents the collector main of a battery of ovens, not shown, which is connected through a crossover main 6 with a suction main 7 to conduct the liberated gases within the collecting main to a cooler 8. A suction is maintained at the intake 9 of the cooler by an exhauster 10 connected with the cooler through a main 11. The exhauster 10 may be of any desired type, and in the present illustration, is a blower driven by an engine 12 operated by steam or the like which is led thereto through steam pipes 13, and its volume controlled by a fly ball governor 14. The fly ball governor is driven from the shaft 15 of the blower by belts 16 and 17 drivingly connected through a variable speed transmission 18.

The variable ratio speed transmission consists primarily of a low speed pulley 19 and a high speed pulley 20 connected by a group of friction drive cones or rollers (not shown) mounted within a housing 21. As this transmission is a conventional device and its structure forms no part of this invention, a detailed description thereof will not be given.

A sprocket 22 is mounted adjacent the high speed pulley 20 and has a sprocket chain 23 meshing therewith which is driven in one direction or the other by a drive sprocket 24 fixed on the end of a shaft 25, driven at a reduced speed by a motor 26. Movement of the sprocket 22 changes the relation of the cones within the housing 21 and changes the speed ratio between the pulleys 19 and 20. The motor 26 is mounted in a housing 27 suitably supported from the base 28 of the device and is actuated to run in one direction or the other at the dictation of an automatic control mounted on a panel 29, the action of which is governed by a butterfly valve 30 mounted in the crossover main 6, in the manner later described.

The valve 30 and its associated mechanism is of that type described in Letters Patent Number 1,588,149, but may be of any other suitable construction, and consists primarily of a motor 31 having a drive connection 32 with the valve whereby it is opened or closed by the motor, the operation of which is controlled by the action of a gasometer 33 connected, through a conduit 34, with the collector main 5 so as to be directly responsive to pressure variations therein, light signals 35 being provided to indicate the positions and variations of the valve 30. The structure above described constitutes the usual collector main governor and with this the exhauster governor is synchronized in the following manner:

The shaft 36 of the valve motor 31 has a limit switch 37 fixed thereto which is arranged to send impulses to the automatic control panel 29 whenever the valve 30 reaches one edge of its free zone, to drive the motor 26 of the variable ratio speed control, changing the ratio between the pulleys 19 and 20 which forces the exhauster to run faster or slower.

The operation and functioning of the control system is entirely electrical and, therefore, reference is now directed particularly to the schematic diagram illustrated in Figure 2 of the drawings, wherein all the connections are depicted in detail, but for the sake of clearness only the major ones are referred to in the description.

As stated, the shaft 36 of motor 31 is provided with a limit switch 37 which may consist of an arm fixed to the shaft and movable between switch arms 38 and 39 normally arranged to engage fixed contacts 40 having a common electrical connection 41 which forms part of a cable 42 leading from the motor 31 to the control panel 29, and is connected with one side 43 of a switch 44 mounted on the panel 29, through conductors 45, 46 and 47.

The live terminals 48 and 49 of the switch 44 have line conductors 50 connected therewith through a master switch 51 mounted on the control panel of the collector main regulator, on which the signal lights 35 are mounted, by suitable conductors on the panel 29, in the cable 42 and in a cable 42' connecting the signal light panel with the motor 31. Opening of the switch 44 cuts the exhauster control out of the circuit and opening of the master switch 51 disconnects the entire system and with the switches closed, as indicated, the contacts 40 are live and form part of a pair of shunt circuits about the relay coils 52 and 53 of magnetic switches 54 and 55, respectively.

From one contact 40, the shunt circuit about the coil 52 is continued through the switch arm 38, a conductor 56 which, as a part of the cable 42, leads to the control panel 29, where suitable conductors connect it with one end of one of a pair of resistance units 57 and 58, the adjacent ends of which are connected, through the resistance unit and to the other terminal 59 of the switch 44 through connections common to both units, and thus to the other side of the line. The shunt about the relay coil 53 beginning with the other contact 40 is through the switch arm 39, a conductor 60 also forming a part of the cable 42 which is connected with the second resistance unit 58 by suitable connections on the panel 29, through the unit 58 and then through the common conductors leading from the resistance units to the terminal 59 of the switch 44.

The coils 52 and 53 are at all times part of a closed circuit, each having one end connected with the terminal 43 of the switch 44 by common conductors, including the conductor 47, part of the conductor 46 and conductors 61 and 62. The opposite sides of the coils are connected with the terminal 59 of switch 44 through their respective resistance units 57 and 58 so that, as the shunt circuit is broken between the switch arm 38 and its associated contact 40 or between the switch arm 39 and its contact 40, the coil 52 or the coil 53 will become energized to close its respective switch, as will be readily apparent.

The position of the arm of the limit switch 37 with respect to the switch levers 38 and 39 is such that as long as valve 30 is within its "free zone" neither of the switch arms will be disengaged from its associated contact, but whenever the valve travels beyond either edge of the "free zone" one or the other of the shunt circuits is broken to permit one of the relay coils to become energized and close its switch. Closing of either the switch 54 or 55 completes the circuit of the motor 26 to drive the same in one direction or the other depending upon which switch is closed and also closes the circuit of a motor 63. The motor 63 drives a timing device 64 through a gear reduction 65, and the speed of the motor 63 and thus the speed of the timing device is readily adjustable by a rheostat 66 mounted on the panel 29 and in series with the armature windings of the motor.

The timing device 64 has a drum or contact ring 67, having a break in its circumference, mounted on its shaft and with which contactors 68 are slidably engageable as the drum begins to revolve, the contacts 68 normally registering with the break in the periphery to be out of electrical engagement with the contact ring 67. As soon as the contacts 68 are bridged by the drum 67, the circuit of the armature of the motor 63 is maintained closed thereby to insure uninterrupted operation until the timing device has completed a full cycle or until the break in the circumference of the drum 67 is again aligned with the contacts 68.

Also mounted on the shaft of the timing device 64 is a pair of electrically connected segments 69 which are individually adjustable on the shaft and with which contacts 70 are engageable throughout part of the revolution of the timing device, contacts 70 being in engagement with the periphery of the segments 69 at the beginning and end of each cycle or one complete revolution of the timing device. As long as the contacts 70 are bridged by the electrically connected segments 69, or in other words, until one of the contacts leaves its segment, the circuit of the motor 26 is maintained closed.

The field of the motor 26 is connected across the lines at all times by being connected with the terminals 43 and 59 of the switch 44 through conductors 71 and 72 forming a part of a cable 73 which connects the motor 26 with a manual control panel 74, to be later described, and from where conductors 75 and 76, forming a part of a cable 77 connecting the manual control panel 74 with the automatic control panel 29, connect the same with the terminals 43 and 58 of the switch 44 through suitable connections on the panel 29.

The armature of the motor 26, however, has its circuit closed, as before stated, by the closing of either of the switches 54 or 55 and is maintained closed only as long as the contacts 70 are electrically bridged so that the duration of operation of the motor 26 is readily controllable by adjusting the segments 69, the direction of rotation of the motor depending upon which switch closes.

When the valve 30 is too far closed, having exceeded that edge of its "free zone", the exhauster speed is to be lowered, the shunt circuit of the coil 53 being then broken at the switch arm 39 to permit energization of the coil 53 to close its switch 55. Closing of the switch 55 closes the circuit of the armature of the motor 26 so that its side 78 will be connected with the terminal 59 of the switch 44 through a conductor 79 which is part of the cable 73 to the manual control panel 74, through suitable connections on the panel leaving the panel through a conductor 80 which forms part of the cable 77 and then through a conductor 81 on the panel 29 to one of the contacts 70, through the segments 69, one arm of the closed switch 55 and to the terminal 59.

The other side 82 of the armature is connected by a conductor 83 with electrically connected contacts 84 of a limit switch 85 on the variable ratio transmission shaft 25 which is driven at a reduced speed by the motor 26, passing through the normally closed switch to arm 86 and a conductor 87 to the control panel 74. From the panel 74, the circuit continues through a conductor 88 which is a part of cable 77, to the panel 29 where suitable conductors lead to another arm of the switch 55, which, through conductors 46 and 47, is connected with the terminal 43 of the switch 44 and thus completes the circuit of the armature of the motor 26 to drive the same in that direction necessary to adjust the variable speed transmission to lower the exhauster speed a predetermined amount.

As before stated, the duration of operation of the motor 26 depends upon the setting of the timing segments 69 which at maximum maintains the circuit closed throughout only part of the cycle so that the major portion of the cycle is devoted to a rest period for the motor which permits the exhauster control to leisurely change the speed of the exhauster one step. If at that time the valve 30 is still beyond the edge of its "free zone", the cycle will be repeated and the exhauster speed lowered another step.

In the event the valve is opened too far and the speed of the exhauster is to be raised, the shunt circuit about the relay 52 is broken at the switch arm 38 and the circuit of the armature of the motor 26 made to reverse the direction of current thereto which, as is well known, causes the motor 26 to run in its opposite direction, changing the speed ratio of the variable transmission to cause the exhauster to raise its speed. The operation of the system during the raising of the exhauster speed is substantially identical to that described in connection with lowering it, the exhauster being raised in steps to accommodate this sluggishness.

The limit switch 85 has its arm 89 secured to the shaft 25 on which the sprocket 24 is fixed, so that rotation thereof beyond a predetermined degree in either direction opens the circuit of the motor 26 and thus prevents over-traveling.

A light signal station 90 is connected with the control panel 29 by a cable 91 and has a red, a white and a green light whereby the operator is enabled to at all times determine the operation and condition of the entire system. When the valve 30 is within its "free zone" both the red and green lights are bright, but when the valve is too far closed and the exhauster speed is being lowered the red light dims out and the green remains bright. Conversely, the green light dims and the red remains bright when the valve is too far open and the speed of the exhauster is raised, the white light remaining bright as long as the system is alive.

The manual control panel 74 has a switch 92 which, as illustrated in full lines, connects the mechanism for automatic control and which, when thrown to its dotted line position, connects the circuit for manual control. When arranged for manual control, the function of the switches 54 and 55 and the timing relay is replaced by a pair of push button switches 93 and 94. Closing of the push button switch 93 bridges the contacts 95 to close the circuit of the armature of the motor 26 so that the direction of its current causes the motor to operate in a direction to raise the speed of the exhauster and closing of the push button switch 94 bridges the contacts 96 to close the circuit of the armature of the motor 26 to lower the speed of the exhauster.

Summarizing the operation of the device, the actual cycle of operation is as follows: Just before charging an oven, the exhauster runs at that speed which holds the valve 30 at approximately thirty degrees open. The oven is charged, thrown on the main and immediately the collecting main regulator valve opens to approximately 75 degrees to accommodate this additional gas. Although the exhauster control immediately raises its speed one step, the action of the valve 30 is so rapid that the effect of the increased speed is not felt until after the valve has come to rest at about 75 degrees open. The exhauster control then leisurely raises the speed two or three and sometimes four steps, gradually bringing the valve back to its thirty degree or approximate normal open position. By this time, the temperature of the coal in the oven has raised considerably, and produces a relatively large volume of liberated gas, thus the exhauster stays at this higher speed, or it may even increase one more step as the gas yield from the oven approaches its maximum, until the yield begins to decrease, when the exhauster will at intervals drop back step by step so that by the time of the next charge it will have receded as many steps as it rose at the time of charge.

What I claim as my invention is:

1. In a fluid pressure regulator for gas and coke oven plants the combination of a collecting main, an exhauster for drawing the gas from the collecting main, a control responsive to pressure variations within the collecting main for regulating the flow of gas from the collecting main and including a valve, a governor driven from the exhauster for regulating its speed, and means for adjusting the speed ratio between the governor and the exhauster, said means being operable solely by the action of the valve and remaining inactive as long as the valve remains within predetermined limits.

2. In a fluid pressure regulator for gas and coke oven plants the combination of a collecting main, a governor for controlling the flow of gas from the collecting main, an exhauster for drawing the gas from the collecting main, and means intermittently operable upon dictation of the collecting main governor for changing the speed of the exhauster in intermittent steps to co-ordinate its speed with the volume of gas coming from the collecting main.

3. In a fluid pressure regulator for gas and coke oven plants, the combination of a collecting main, an exhauster for drawing gas from the collecting main, a control responsive to pressure variations within the collecting main for regulating the flow of gas from the collecting main to the exhauster and including a valve, a governor driven from the exhauster for controlling its speed, and means responsive solely to the movement of the valve for adjusting the speed ratio between the governor and the exhauster.

4. In a fluid pressure regulator for gas and coke oven plants, the combination of a collecting main, an exhauster for drawing gas from the collecting main, a control responsive to pressure variations within the collecting main and including a valve movable to regulate the flow of gas from the collecting main, a governor driven from the exhauster for regulating its speed, and means operable upon movement of the valve beyond predetermined limits for adjusting the speed ratio between the governor and the exhauster to vary the speed of the exhauster whenever the pressure in the collecting main exceeds predetermined limits.

5. In a fluid pressure regulator for gas and coke oven plants, the combination of a collecting main, an exhauster for drawing gas from the collecting main, a control responsive to pressure variations within the collecting main and including a valve movable to regulate the flow of gas from the collecting main, a governor driven from the exhauster for controlling its speed, means for adjusting the speed ratio between the governor and the exhauster, and means intermittently operable upon movement of the valve beyond predetermined limits for actuating the adjusting means to vary the speed of the exhauster.

6. In a fluid pressure regulator for gas and coke oven plants, the combination of a collecting main, an exhauster for drawing gas from the collecting main, a control responsive to pressure variations within the collecting main and including a valve movable to regulate the flow of gas from the collecting main, a fly-ball governor driven from the exhauster for controlling the exhauster speed, and means for adjusting the speed ratio between the fly-ball governor and the exhauster in accordance with the movement of said valve to co-ordinate the speed of the exhauster with the volume of gas coming from the collecting main.

7. In a fluid pressure regulator for gas and coke oven plants, the combination of a collecting main, a collecting main governor for controlling the flow of gas from the collecting main including a valve, an exhauster for drawing gas from the collecting main, and means intermittently operable to change the exhauster speed in intermittent steps as long as the valve remains beyond predetermined limits.

In testimony whereof I have hereunto affixed my signature.

WILMER M. SHALLCROSS.